United States Patent
Totzke

(10) Patent No.: US 12,539,850 B2
(45) Date of Patent: Feb. 3, 2026

(54) METHOD FOR OPERATING A MOTOR VEHICLE, AND MOTOR VEHICLE

(71) Applicant: AUDI AG, Ingolstadt (DE)

(72) Inventor: Ingo Totzke, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 303 days.

(21) Appl. No.: 17/777,252

(22) PCT Filed: Nov. 23, 2020

(86) PCT No.: PCT/EP2020/083015
§ 371 (c)(1),
(2) Date: May 16, 2022

(87) PCT Pub. No.: WO2021/105039
PCT Pub. Date: Jun. 3, 2021

(65) Prior Publication Data
US 2022/0396262 A1    Dec. 15, 2022

(30) Foreign Application Priority Data
Nov. 27, 2019    (DE) ..................... 10 2019 132 091.7

(51) Int. Cl.
*B60W 30/10* (2006.01)
*B60W 30/18* (2012.01)
(Continued)

(52) U.S. Cl.
CPC ...... *B60W 30/10* (2013.01); *B60W 30/18154* (2013.01); *B60W 50/14* (2013.01);
(Continued)

(58) Field of Classification Search
None
See application file for complete search history.

(56) References Cited

U.S. PATENT DOCUMENTS

| 9,908,526 B2 | 3/2018 | Eigel |
| 10,274,955 B2 | 4/2019 | Eigel |
| (Continued) | | |

FOREIGN PATENT DOCUMENTS

| DE | 102012211568 A1 | 1/2014 |
| DE | 102013009339 A1 | 12/2014 |
| (Continued) | | |

OTHER PUBLICATIONS

International Search Report and Written Opinion of the International Searching Authority directed to related International Patent Application No. PCT/EP2020/083015, mailed Feb. 18, 2021, with attached English-language translation; 20 pages.
(Continued)

*Primary Examiner* — Hitesh Patel
*Assistant Examiner* — Wenyuan Yang
(74) *Attorney, Agent, or Firm* — Sterne, Kessler, Goldstein & Fox P.L.L.C.

(57) ABSTRACT

An approach for operating a motor vehicle that is designed for an autonomous and/or partially autonomous driving operation in which the motor vehicle is moved along a predetermined driving trajectory. During the autonomous or partially autonomous driving operation, a driving trajectory running centrally or substantially centrally along the lane traveled is shifted to the edge of the lane on the basis of lane information describing the lane currently traveled by the motor vehicle, and on the basis of speed information describing a current speed of the motor vehicle, and on the basis of at least one piece of traffic information describing a current traffic volume in the surroundings of the motor vehicle. Alternatively, or in addition, the motor vehicle is stopped before a bottleneck or an intersection is entered on the basis of road-course information describing the bottleneck or the intersection along the road course to be traveled,
(Continued)

and additionally on the basis of emergency vehicle information describing the presence of an emergency vehicle in the surroundings of the motor vehicle, and/or on the basis of accident information describing an accident along the road course to be traveled.

14 Claims, 2 Drawing Sheets

(51) Int. Cl.
  *B60W 50/14* (2020.01)
  *B60W 60/00* (2020.01)
(52) U.S. Cl.
  CPC ..... *B60W 60/001* (2020.02); *B60W 2050/146* (2013.01); *B60W 2520/00* (2013.01); *B60W 2552/53* (2020.02); *B60W 2556/00* (2020.02)

(56) References Cited

U.S. PATENT DOCUMENTS

| | | | |
|---|---|---|---|
| 2015/0286219 A1 | 10/2015 | Reichel et al. | |
| 2015/0307131 A1* | 10/2015 | Froeschl | B62D 15/025 701/25 |
| 2016/0132054 A1* | 5/2016 | Eigel | B60W 30/18 701/23 |
| 2017/0212513 A1* | 7/2017 | Iida | B60W 60/0011 |
| 2018/0012496 A1* | 1/2018 | Hasberg | B60W 30/18163 |
| 2018/0137756 A1* | 5/2018 | Moosaei | G08G 1/09675 |
| 2018/0364700 A1* | 12/2018 | Liu | G05D 1/0038 |

FOREIGN PATENT DOCUMENTS

| | | | | |
|---|---|---|---|---|
| DE | 102013009400 A1 | 12/2014 | | |
| DE | 102013220307 A1 | 4/2015 | | |
| DE | 102014200700 A1 | 7/2015 | | |
| DE | 102015014789 A1 * | 5/2016 | ......... | G08G 1/0965 |
| DE | 102016011544 A1 | 4/2017 | | |
| DE | 102017126790 A1 | 5/2018 | | |
| DE | 102016224752 A1 | 6/2018 | | |
| DE | 102019000934 A1 | 7/2019 | | |
| EP | 1808350 A1 | 7/2007 | | |
| EP | 1816622 A2 | 8/2007 | | |

OTHER PUBLICATIONS

International Preliminary Report on Patentability directed to related International Patent Application No. PCT/EP2020/083015, mailed May 17, 2022, with attached English-language translation; 18 pages.

* cited by examiner

METHOD FOR OPERATING A MOTOR VEHICLE, AND MOTOR VEHICLE

TECHNICAL FIELD

The present disclosure relates to a method for operating a motor vehicle, wherein the motor vehicle is designed for an autonomous and/or partially autonomous driving operation in which the motor vehicle is moved along a predetermined driving trajectory. The present disclosure also relates to a motor vehicle.

BACKGROUND

Within the framework of road traffic regulations, clear regulations have been issued on how emergency lanes are to be formed, in particular on multi-lane road portions, so that emergency vehicles can pass unimpeded in case of increased traffic volume. However, the drivers of emergency vehicles repeatedly report time delays when reaching or leaving the scene of an accident because the required emergency lanes were not formed in accordance with the regulations. In order to avoid this problem, the drivers of motor vehicles are repeatedly reminded, for example, via information banners on bridges over highways, how to ideally form an emergency lane. In addition to a manual driving operation in which the motor vehicle is controlled solely by the driver, it is also desirable for an autonomous or partially autonomous driving operation, in which the motor vehicle is controlled entirely or to some extent without any control actions by the driver, that an emergency lane in accordance with the regulations can be formed without the intervention of a driver. For this purpose, different approaches are known from the prior art.

DE 10 2016 011 544 A1 describes a method for operating a vehicle which has a driver assistance device for partially autonomous or autonomous operation of the vehicle. Traffic-relevant information is detected by the driver assistance device, wherein, when a predicted formation of a traffic jam is determined, the vehicle, on the basis of the detected traffic-relevant information, is guided on a lane to form and maintain an emergency lane. In this case, a driving behavior of vehicles in front is detected as traffic-relevant information.

DE 10 2013 220 307 A1 describes a system for improved support of the driver of a motor vehicle when forming emergency lanes. The system comprises a plurality of detection devices that characterize the traffic situation and the surroundings of the vehicle. A need for forming an emergency lane is determined by a controller using the detected parameters. Furthermore, one or more actions of the motor vehicle for forming an emergency lane are determined and corresponding information is output to the driver and/or a semi-automated or fully automated control of the motor vehicle is carried out.

DE 10 2015 014 789 A1 describes a method for forming a driving lane in road portions with a high traffic volume, wherein the driving lane for the passing of at least one emergency vehicle in the event of traffic obstructions is formed in the road portion. For this purpose, an emergency vehicle coming from behind or an oncoming vehicle is detected by a first vehicle using on-board sensors and an evasive movement is initiated, wherein information about the detection of the emergency vehicle or the oncoming vehicle is successively forwarded from one vehicle to the next vehicle. In this case, a note regarding the initiated evasive movement of the vehicle transmitting the information is attached to said information, on the basis of which the vehicle receiving the information derives its own evasive movement.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
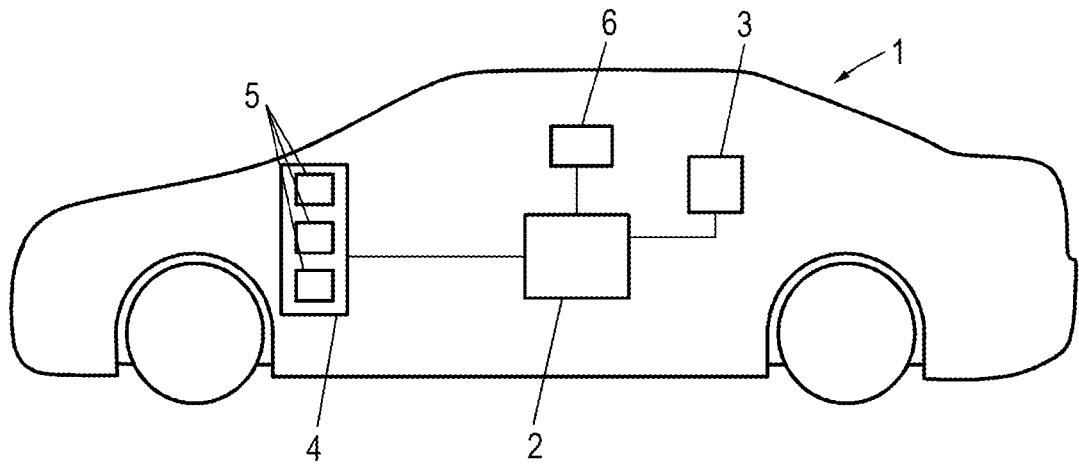
FIG. 1 is a side view of an embodiment of a motor vehicle according to the present disclosure.

The problem addressed by the present disclosure is that of improving the behavior of a motor vehicle in an autonomous and/or partially autonomous driving operation when emergency lanes are formed.

For solving this problem, the present disclosure provides in a method of the initially described type that, during the autonomous or partially autonomous driving operation, a driving trajectory running centrally along the lane traveled is shifted to the edge of the lane on the basis of lane information describing the lane currently traveled by the motor vehicle, and on the basis of speed information describing a current speed of the motor vehicle, and on the basis of at least one piece of traffic information describing a current traffic volume in the surroundings of the motor vehicle, and/or the motor vehicle is stopped before a bottleneck or an intersection is entered on the basis of road-course information describing the bottleneck or the intersection along the road course to be traveled, and additionally on the basis of emergency vehicle information describing the presence of an emergency vehicle in the surroundings of the motor vehicle, and/or on the basis of accident information describing an accident along the road course to be traveled.

The advantage of the solution according to an embodiment is that the motor vehicle can react in an anticipatory manner in the autonomous and/or partially autonomous driving operation and, in particular, an unintentional blocking of an emergency lane by the motor vehicle can be prevented. Furthermore, the method according to an embodiment advantageously avoids that during assisted driving, i.e., when operating the motor vehicle in an autonomous driving operation or in a partially autonomous driving operation, a control action for keeping emergency lanes clear is required, which must be carried out contrary to the current control functions of the control device controller realizing the autonomous or partially autonomous driving operation. In a partially autonomous operation, for example, when driving with lane departure warning and/or traffic jam assistance, the driver does not have to steer against a steering torque generated as part of the partially autonomous operation or brake against an acceleration torque in order to form an emergency lane or to stop the motor vehicle to keep an emergency lane open.

Basically, in an assisted driving operation, the motor vehicle is moved along a driving trajectory which runs centrally or substantially centrally along the lane traveled by the motor vehicle. For forming an emergency lane and/or for stopping the motor vehicle, the driver must actively steer against the lane guidance of the driver assistance system during the autonomous or partially autonomous driving operation in order to leave the center of the lane, or override the lane guidance, for example, by a stopping action, so that an emergency lane can be formed and/or a bottleneck can be kept open.

The shifting of a driving trajectory running centrally or substantially centrally along the lane traveled to the edge of the lane on the basis of the lane information as well as the speed information and the traffic information makes it possible for the motor vehicle to move independently from the center of the lane to an edge of the lane in the autonomous or partially autonomous driving operation, so that the formation of an emergency lane is automatically initiated when this is required due to the current speed of the motor vehicle and the current traffic volume in the surroundings of the motor vehicle. The driving trajectory can remain shifted permanently or for a certain period of time. In particular, the shifted driving trajectory can be used for the autonomous or partially autonomous driving operation until the continuously detected speed information and/or the continuously detected traffic information indicates that an emergency lane no longer has to be formed or maintained. The method according to the embodiment can be used both in city traffic and outside of urban regions.

The lane information can describe whether the motor vehicle is on a single-lane road or whether the motor vehicle is currently on a multi-lane road and on which of the lanes of a multi-lane road the motor vehicle is currently located. Depending on which lane of a multi-lane road the motor vehicle is currently located, the driving trajectory can be adjusted to the left edge of the lane or to the right edge of the lane. The shifted driving trajectory can be positioned, for example, next to a lane marking at the edge of the lane currently traveled. In order to determine to which edge of the lane the motor vehicle is to be moved, the lane information can also contain information about the predefined regulations according to which an emergency lane is to be formed in the lane currently traveled. The driving trajectory can then be shifted to the edge of the lane required by the regulations and provided for forming the emergency lane. For example, these regulations can provide that, when driving in the leftmost lane of a multi-lane road, the driving trajectory is shifted to the left edge of the lane and in the further lanes of the multi-lane road, the driving trajectory is shifted to the right edge of each lane.

Taking into account the speed information and the traffic information advantageously allows the driving trajectory to be shifted only when both the speed of the motor vehicle and the traffic volume in the surroundings of the motor vehicle suggest the need to form an emergency lane. As a result, an unintentional shifting of the driving trajectory in situations in which it is already possible for an emergency vehicle to get through without any problems is advantageously avoided.

Furthermore, the method according to an embodiment advantageously ensures that the motor vehicle is stopped before driving through a bottleneck or an intersection in the road course to be traveled by the motor vehicle if there is both a bottleneck or an intersection present in the road course to be traveled and an emergency vehicle is also present in the surroundings of the motor vehicle and/or an accident has occurred on the road to be traveled. The emergency vehicle can in particular be an emergency vehicle with a special right of way, for example, an ambulance, a police vehicle or a fire engine. Stopping according to the present disclosure represents an emergency stop in the autonomous or partially autonomous driving operation, which takes place in particular without manual intervention by the driver.

The stopping of the motor vehicle provided according to an embodiment advantageously makes it possible, for example, in front of an intersection, which an emergency vehicle crossing the intersection can pass unimpeded. Furthermore, it is advantageously avoided that the motor vehicle drives into a bottleneck, for example, a construction site or a lane narrowing, and blocks this bottleneck for an approaching emergency vehicle, so that an unimpeded passing of the emergency vehicle is prevented. By stopping in front of the bottleneck, the lane or lanes in the bottleneck are not blocked by the motor vehicle in the autonomous or partially autonomous driving operation, so that the emergency vehicle can enter the bottleneck or the intersection unimpeded.

In a preferred embodiment of the present disclosure, it can be provided that, before the motor vehicle is stopped, the driving trajectory is shifted to the edge of the lane traveled on the basis of the lane information. This advantageously allows for the motor vehicle stopping in front of the bottleneck or the intersection to be positioned in the most space-saving manner possible and that as much space as possible remains for an emergency vehicle that may be approaching from the front or the rear. For this purpose, the lane information describing the lane currently traveled by the motor vehicle can be taken into account. As has already been described above for shifting the driving trajectory, the lane information can also be used to determine analogously for stopping whether the motor vehicle is to be stopped at the left or at the right edge of the lane. In the case of a single-lane road, it may also be possible to determine on the basis of the lane information whether the motor vehicle should be moved to the left edge of the lane or to the right edge of the lane when stopping.

According to an embodiment, it can be provided that, in a lane adjacent to a further lane, a road shoulder or an emergency rest stop, the driving trajectory is shifted beyond the edge of the lane to the further lane, the road shoulder or the emergency rest stop. The lane information used can describe, for example, whether the lane currently traveled is adjacent to a further lane, which side it is adjacent to, and/or whether the lane is adjacent to a road shoulder or an emergency rest stop. The shifting of the driving trajectory beyond the edge of the lane currently traveled advantageously makes it possible that the largest possible free space is made available to an emergency vehicle that may be approaching. By shifting the driving trajectory beyond the edge of the lane currently traveled to the further lane, the road shoulder or the emergency rest stop, it can be achieved that the motor vehicle in its autonomous or partially autonomous driving operation deviates from a target trajectory in the center of the lane and moves to, and/or is stopped on, another lane or road shoulder or the emergency rest stop.

In a preferred embodiment of the present disclosure, it can be provided that the driving trajectory is shifted when a speed of the motor vehicle is below a limit value and/or when the traffic information describes an increased traffic volume. If the speed of the motor vehicle is above a limit value and/or if the traffic volume is low, it is not necessary to form an emergency lane as a precautionary measure, since both a speed of the motor vehicle above a limit value and a low traffic volume only occur in traffic conditions in which a possible passing of an emergency vehicle is not impeded by the current traffic, so that it is not necessary to form an emergency lane. A speed of 30 km/h, for example, can be used as a limit value, so that the driving trajectory is only shifted when the speed of the motor vehicle is less than 30 km/h. It is also possible to use other limit values that are higher or lower than 30 km/h. An increased traffic volume can in particular refer to a traffic volume that disrupts a smooth flow of traffic, for example, traffic that is congested or standing still.

In a preferred embodiment of the present disclosure, it is provided that the autonomous or partially autonomous driving operation of the motor vehicle is continued after the driving trajectory has been shifted and/or that the autonomous or partially autonomous driving operation of the motor vehicle is at least to some extent discontinued after the motor vehicle has stopped. After the driving trajectory has been shifted, the motor vehicle can thus continue its autonomous or partially autonomous driving operation along a driving trajectory that has been shifted to the edge of the lane, or possibly along a driving trajectory that has been shifted beyond the edge of the lane, for example, along a driving trajectory that runs on a further lane, a road shoulder or an emergency rest stop. After stopping the motor vehicle, suspending the autonomous or partially autonomous driving operation can prevent the motor vehicle from moving back towards the bottleneck or the intersection that is to be kept free by said stop.

According to an embodiment, it can be provided that the lane information and/or the road-course information is determined on the basis of a data set stored in a storage device, in particular a database of a navigation device of the motor vehicle. The lane information and/or the road-course information can be determined, for example, from a data set stored as map information, for example, map information used for a navigation device. Different storage media suitable for storing databases or map information, in particular high-resolution map information, can be used as the storage device.

According to an embodiment, it can be provided that the traffic information and/or the emergency vehicle information and/or the accident information are transmitted to a communication device of the motor vehicle via a communication link. For example, a car-2-X communication can be used as the communication link, via which data can be exchanged between motor vehicles and/or between a motor vehicle and an infrastructure and/or a remotely located computing unit. Additionally or alternatively to a transmission via the communication link, the traffic information and/or the emergency vehicle information and/or the accident information can also be determined by at least one sensor device of the motor vehicle.

The transmission of the emergency vehicle information and/or the accident information via a communication link advantageously allows the motor vehicle to be able to react to accidents or emergency vehicles that are outside the detection range of onboard environment sensors, so that in particular driving through bottlenecks can also be prevented if an accident that has occurred on the road course to be traveled and/or an approaching emergency vehicle in the surroundings of the motor vehicle cannot yet be detected by the motor vehicle itself. The speed information used to shift the driving trajectory can be determined in particular by the motor vehicle itself. In particular, speed information can be used which is already present in the controller that implements the autonomous or partially autonomous driving operation.

According to the present disclosure, it can be provided that the driving trajectory is shifted and/or the motor vehicle is stopped on the basis of surroundings information describing objects in the surroundings of the motor vehicle. The surroundings information can be used to describe, for example, stationary objects such as road construction elements and/or moving objects such as further motor vehicles. For example, traffic signs, construction site boundaries, curbs, crash barriers or the like that are present in the immediate surroundings of the motor vehicle can be described as road construction elements. Further road users standing or parking in the surroundings of the motor vehicle can also be detected as stationary objects. Further motor vehicles and/or further road users, for example, which are in particular in the direct surroundings of the motor vehicle, can be described as moving objects.

Taking into account the surroundings information advantageously allows for the driving trajectory to be shifted on the basis of the objects in the surroundings of the motor vehicle, so that the motor vehicle can be prevented from accidentally colliding with one or more objects in the surroundings of the motor vehicle when driving on the shifted driving trajectory.

For determining the surroundings information, it can be provided according to the present disclosure that said surroundings information is determined via a sensor device of the motor vehicle, wherein the sensor device comprises in particular at least one laser sensor and/or at least one lidar sensor and/or at least one radar sensor and/or at least one camera. It is also possible that the sensor device is additionally or alternatively designed to determine the emergency vehicle information and/or the accident information and/or the lane information and/or the traffic information and/or that the surroundings information is used in particular in addition to the data set stored in a storage device for determining the lane information and/or the road-course information.

Furthermore, it can be provided according to the present disclosure that the surroundings information is at least partially displayed on at least one display device of the motor vehicle, in particular in a bird's-eye view and/or by means of a projection onto a windshield of the motor vehicle. This advantageously allows the driver to be able to move the motor vehicle manually in a simple manner if this is still necessary in addition to the shifting of the driving trajectory or in addition to stopping the motor vehicle. In particular, it is possible for the road-course information and/or the lane information to also be displayed on the display device. The position of an emergency vehicle according to the emergency vehicle information and/or the position of an accident according to the accident information can also be displayed via the display device. In particular, a screen in the vehicle interior, on which a schematic map display and/or a camera image with augmentation can be displayed, can be used as the display device. A head-up display, in particular a contact-analog head-up display (cHUD), can also be used as a display device.

Displaying in particular the immediate surroundings of the motor vehicle in a bird's eye view (so-called top view display or bird's-eye display) enables the driver to move the motor vehicle with the knowledge of obstacles, such as curbs or crash barriers, which said driver may no longer be able to see visually and to steer the motor vehicle possibly manually closer to an edge of the lane, if deemed necessary, with the knowledge of the surroundings of the motor vehicle. The distance to other road users is also easier to estimate if the surroundings information is displayed, so that targeted maneuvering of the motor vehicle by the driver is simplified.

In a preferred embodiment of the present disclosure, it can be provided that, when the driving trajectory is shifted and/or when the motor vehicle is stopped, and/or on the basis of the accident information and/or the emergency vehicle information, a visual and/or acoustic warning signal is output to a driver of the motor vehicle. For example, a visual warning signal can be displayed via the display device of the motor vehicle, which is also used to display the surroundings information, for example, as a warning message or as an information message. Additionally or alternatively, it is also possible to use a further display device for displaying the visual warning signal. By displaying a visual warning message or by generating a warning tone as an acoustic warning signal, the driver can be made aware of the shift in the driving trajectory or the stopping of the motor vehicle during the autonomous or partially autonomous driving operation of the motor vehicle, so that the driver can be made aware that the following driving maneuver is used to keep emergency lanes free in an anticipatory manner.

For a motor vehicle according to the present disclosure, it is provided that it comprises a controller, wherein the controller is designed to carry out an autonomous and/or partially autonomous driving operation in which the motor vehicle is moved along a predetermined driving trajectory, wherein the controller is designed to carry out a method according to the present disclosure.

All the advantages and details described above in relation to the method according to the present disclosure also apply correspondingly to the motor vehicle according to the present disclosure.

Figure 2:
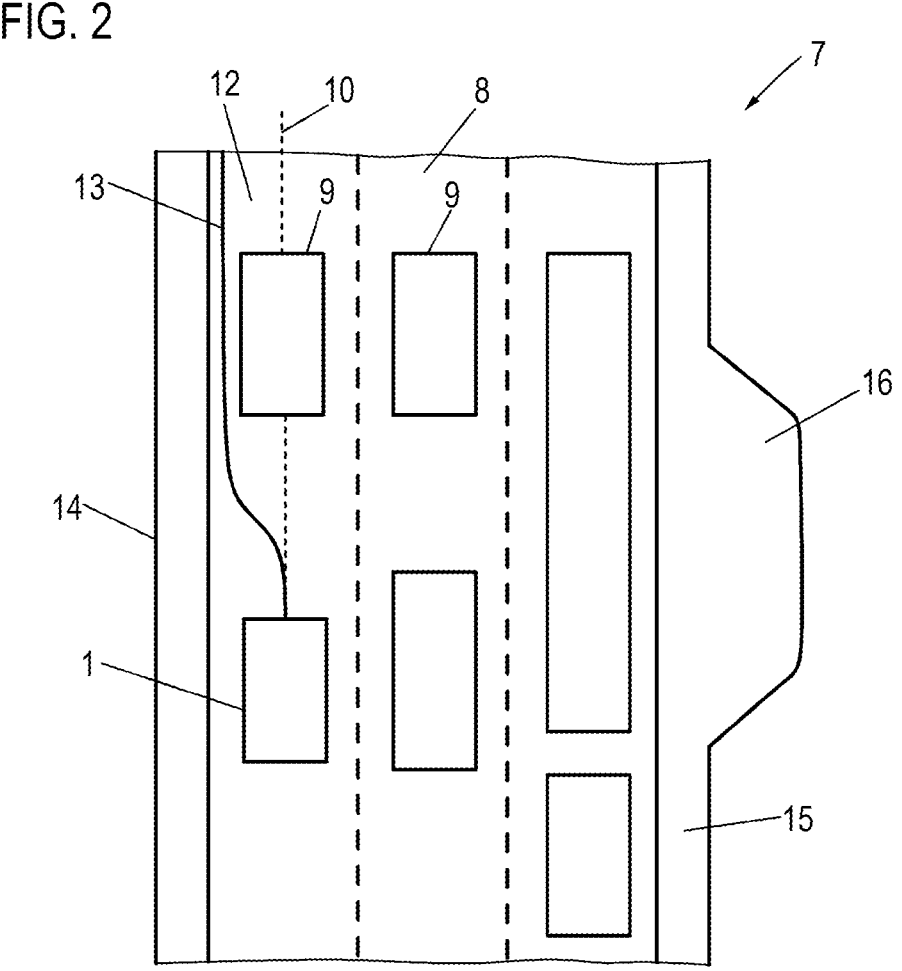
FIG. 2 shows a first traffic situation for describing an embodiment of the method according to the present disclosure.
Figure 3:
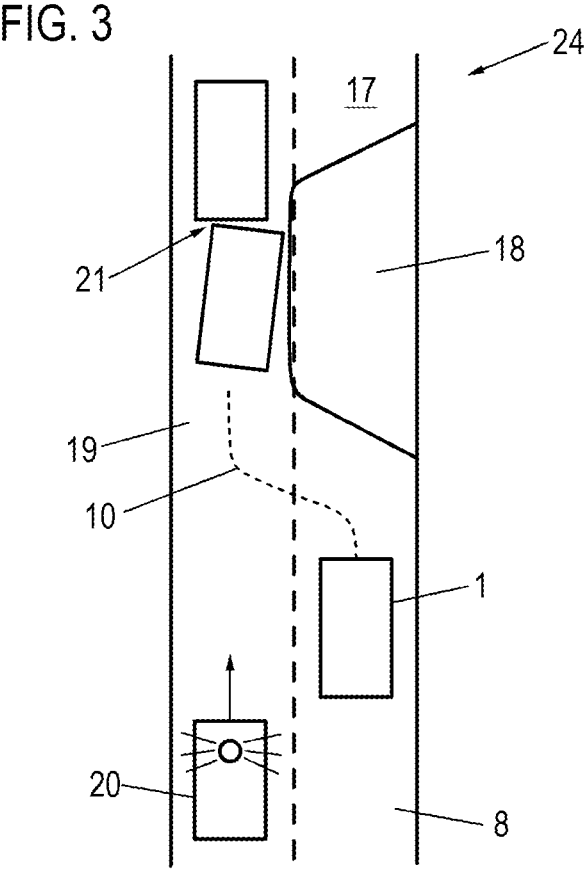
FIG. 3 shows a second traffic situation for describing the embodiment of the method according to the present disclosure.
Figure 4:
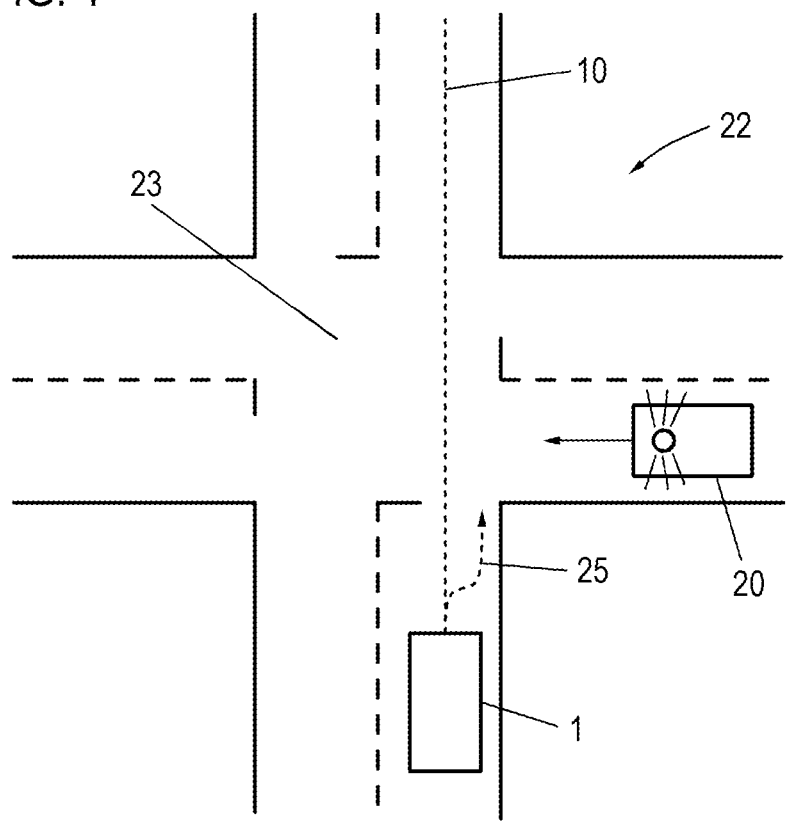
FIG. 4 shows a third traffic situation for describing the embodiment of the method according to the present disclosure.

Further advantages and details of the present disclosure shall become apparent from the embodiments described below and from the drawings. They are schematic representations in which:

FIG. 1 is a side view of an embodiment of a motor vehicle according to the present disclosure;

FIG. 2 shows a first traffic situation for describing an embodiment of the method according to the present disclosure;

FIG. 3 shows a second traffic situation for describing the embodiment of the method according to the present disclosure; and FIG. 4 shows a third traffic situation for describing the embodiment of the method according to the present disclosure.

FIG. 1 shows an embodiment of a motor vehicle 1 according to the present disclosure.

The motor vehicle 1 comprises a controller 2 which is designed to move the motor vehicle 1 in an autonomous and/or partially autonomous driving operation. The autonomous and/or partially autonomous driving operation of the motor vehicle 1 represents an assisted driving operation and can be designed, for example, as lane departure warning and/or traffic jam assistance. Furthermore, the motor vehicle 1 comprises a communication device 3 via which different information can be transmitted to the motor vehicle 1 by means of a communication link, wherein the data received from the communication device 3 is made available to the controller 2.

Furthermore, the controller 2 is connected to a sensor device 4 of the motor vehicle 1. In this case, the sensor device 4 comprises a plurality of sensors 5. The sensors 5 can comprise at least one laser sensor, at least one lidar sensor, at least one radar sensor and/or at least one camera, wherein the sensors 5 of the sensor device 4 are able to detect surroundings of the motor vehicle 1. Surroundings information describing the surroundings of the motor vehicle 1 is generated via the sensor device 4 and transmitted to the controller 2. The surroundings information describes stationary and moving objects that are present in the surroundings of the motor vehicle and detected by the sensors 5.

Traffic information describing the current traffic volume in the surroundings of the motor vehicle and emergency vehicle information describing the presence of an emergency vehicle in the surroundings of the motor vehicle and accident information describing an accident on a road course to be traveled are also received via the communication device 3. This information is transmitted to the communication device 3 of the motor vehicle 1, for example, by a further road user and/or by a stationary computing device via a car-2-X communication link.

The controller 2 is also designed to determine speed information which describes a current speed of the motor vehicle 1. The controller 2 is connected to a storage device 6 which is designed, for example, as a database of a navigation device of the motor vehicle 1. The storage device 6 contains a data set stored as high-resolution map information, on the basis of which lane information describing the lane currently traveled by the motor vehicle and road-course information describing a bottleneck or an intersection in a road course to be traveled by the motor vehicle 1 are determined by the controller 2. It is also possible for the controller 2 to take into account additional information provided by the sensor device 4 in order to determine the lane information and/or the road-course information.

FIG. 2 shows a first traffic situation 7 which is used to describe an embodiment of a method according to the present disclosure. The traffic situation 7 comprises a three-lane road 8 on which a motor vehicle 1 according to the embodiment and a plurality of further road users 9 are driving. The motor vehicle 1 moves in an autonomous or partially autonomous driving operation along a predetermined driving trajectory 10.

The controller 2 of the motor vehicle 1 determines that the current speed of the motor vehicle is below a speed limit value of, for example, 30 km/h and that the traffic information determined by the controller 2 describes an increased traffic volume from further road users 9, resulting in congested traffic on the road portion 8. Furthermore, the controller 2 determines lane information which describes that the motor vehicle 1 is currently in the far left lane 12 of the road portion 8.

The controller 2 shifts the predetermined driving trajectory 10 to a shifted driving trajectory 13 on the basis of the lane information, the speed information, and the traffic information. The shifted driving trajectory 13 no longer runs centrally along the lane 12 but is shifted to the left edge of the lane. After the driving trajectory has been shifted, the motor vehicle 1 is moved along the shifted driving trajectory 13. As a result, an emergency lane is formed between the far left lane 12 and the further lane adjoining on the right, which, if necessary, can be passed by an emergency vehicle.

Furthermore, the sensor device 4 of the motor vehicle 1 generates surroundings information, by means of which stationary and moving objects in the surroundings of the motor vehicle 1 can be detected. For example, a crash barrier 14 can be detected as a stationary object. The further road users 9 in the surroundings of the motor vehicle 1 are also detected as stationary and/or moving objects. The determined surroundings information is then displayed on a display device of the motor vehicle 1 in order to make it easier for a driver of the motor vehicle 1 to move the motor vehicle 1 manually, if necessary. A display in the interior of the motor vehicle and/or a head-up display, in particular a contact-analog head-up display, can be used as the display device.

Analogously to shifting the driving trajectory 10 to the left edge of the lane 12, the driving trajectory 10 can also be shifted to the edge of the center or the far right lane when the motor vehicle 1 is driving in the center lane or the right lane of the road portion 8. The lane information describes in which lane of the road portion 8 the motor vehicle 1 is currently located and which regulations are to be applied to form an emergency lane. As a result, the edge of the lane to which the driving trajectory 10 is to be shifted is determined for the lane currently traveled. For example, the driving trajectory can also be shifted beyond a lane marking on the right edge of the center lane to the far right lane when the motor vehicle 1 is driving in the center lane. When driving in the far right lane, the driving trajectory can also be shifted to a road shoulder 15 and/or to an emergency rest stop 16.

FIG. 3 shows a second traffic situation 24. In this situation, the motor vehicle 1 is on a two-lane road portion 8. More precisely, the motor vehicle 1 is in the right lane 17 of the road portion 8. The lane 17 is blocked by a construction site 18 in the further road course to be traveled, so that a bottleneck, in which only the left-hand lane 19 is available for driving, forms on the road portion 8 in the construction site region. The construction site 18 and/or the bottleneck resulting therefrom are described in the road-course information.

On the basis of the road-course information and the emergency vehicle information transmitted to the motor vehicle 1, which describes the approach of an emergency vehicle 20 in the surroundings of the motor vehicle 1, and/or on the basis of accident information transmitted to the motor vehicle 1, which describes an accident 21 in the construction site region, the motor vehicle 1 is stopped in the right lane 17 before traveling through the bottleneck, so that the motor vehicle 1 does not pass the bottleneck, i.e., the construction site 18, in the region of the left lane 19 along the predetermined driving trajectory 10. As a result, the emergency vehicle 20 is not blocked by the motor vehicle 1 on its way to the accident 21. After the motor vehicle 1 has stopped, the autonomous or partially autonomous driving operation is discontinued, at least temporarily, in order to keep the left lane 19 free even after the emergency vehicle 20 has passed. The emergency vehicle 20 is an emergency vehicle with special right of way, for example, an ambulance, a police vehicle, or a fire engine.

FIG. 4 shows a third traffic situation 22. An intersection 23 is located in the road course to be traveled by the motor vehicle 1. The presence of the intersection 23 is described by the road-course information evaluated by the controller 2. On the basis of said road-course information and the emergency vehicle information describing an approach of the emergency vehicle 20 in the surroundings of the motor vehicle 1, the motor vehicle 1 is stopped before driving into the intersection 23 and no longer moves along the predetermined driving trajectory 10. As a result, the emergency vehicle 20 can pass through the intersection 23 unimpeded by the motor vehicle 1. The autonomous and/or partially autonomous driving operation of the motor vehicle 1 can be continued, for example, if additional or updated emergency vehicle information and/or surroundings information detecting the emergency vehicle, which the motor vehicle can determine using its sensor device 4, indicates that the emergency vehicle 20 has passed the intersection 23 and no further emergency vehicle is present in the surroundings of the motor vehicle 1.

On the basis of the lane information, the driving trajectory 10 of the motor vehicle 1 can also be shifted before the motor vehicle is stopped. For example, the driving trajectory 10 can be shifted to the right edge of the lane traveled by the motor vehicle 1 before the motor vehicle 1 is stopped, resulting in a shifted driving trajectory 25. This is particularly meaningful when the emergency vehicle information describes an emergency vehicle approaching the motor vehicle 1 from the front or the rear, since moving the driving trajectory 10 before stopping leaves as much space as possible for crossing the intersection 23.

The traffic situations described can occur both in city traffic and outside of urban regions. The method according to the embodiment ensures that emergency lanes are kept clear for an emergency vehicle 20 and are not blocked due to the autonomous or partially autonomous driving operation of the motor vehicle 1.

The shifting of the driving trajectory 10 and/or the stopping of the motor vehicle 1 before a bottleneck can be made known to the driver of the motor vehicle 1 by visual warning information and/or by acoustic warning information.

The invention claimed is:

1. A method for operating a motor vehicle, wherein the motor vehicle is designed for an autonomous or partially autonomous driving operation, and wherein the motor vehicle is moved along a predetermined driving trajectory during the autonomous or the partially autonomous driving operation, the method comprising:
   determining an edge of a lane being currently traveled by the motor vehicle, wherein the determining is based on predefined regulations for forming an emergency lane;
   shifting a driving trajectory running centrally along the lane currently traveled to the determined edge of the lane without leaving the lane to form the emergency lane based on:
      lane information describing a current location of the motor vehicle,
      emergency vehicle information received via a communication module or a sensor,
      speed information describing a current speed of the motor vehicle, and
      traffic information describing a current traffic volume in surroundings of the motor vehicle, wherein the driving trajectory is shifted based on the current speed of the motor vehicle being below a limit value and the current traffic volume in the surroundings of the motor vehicle indicating an increased traffic volume,
   adjusting, when the motor vehicle is on a multi-lane road, the driving trajectory from the determined edge of the lane to another edge of the lane, the other edge of the lane being determined based on the predefined regulations and the current location of the motor vehicle on the multi-lane road; and
   maintaining the shifted driving trajectory until the emergency lane is no longer required.

2. The method of claim 1, further comprising:
   stopping the motor vehicle before entering a bottleneck or an intersection based on whether the bottleneck or the intersection lie along a road course to be traveled or whether an accident has occurred on the road course.

3. The method of claim 2, wherein the autonomous or the partially autonomous driving operation of the motor vehicle is at least temporarily discontinued after the motor vehicle has stopped.

4. The method of claim 2, wherein the traffic information and/or the emergency vehicle information and/or information describing the accident are transmitted to a communication device of the motor vehicle via a communication link.

5. The method of claim 2, wherein the driving trajectory is shifted and/or the motor vehicle is stopped on a basis of surroundings information describing objects in the surroundings of the motor vehicle.

6. The method of claim 5, wherein the surroundings information is determined via the sensor of the motor vehicle, wherein the sensor comprises a laser sensor, a lidar sensor, a radar sensor, or a camera.

7. The method of claim 5, wherein the surroundings information is at least partially displayed on at least one display device of the motor vehicle, in particular in a bird's-eye view and/or a projection onto a windshield of the motor vehicle.

8. The method of claim 2, wherein a visual and/or acoustic warning signal is output to a driver of the motor vehicle when the driving trajectory is shifted and/or when the motor vehicle is stopped and/or on a basis of information describing the accident and/or the emergency vehicle information.

9. The method of claim 1, wherein in a lane adjacent to a further lane, a road shoulder, or an emergency rest stop, the driving trajectory is shifted beyond the edge of the lane to the further lane, the road shoulder or the emergency rest stop.

10. The method of claim 1, wherein the driving trajectory is shifted when a speed of the motor vehicle is below the limit value and/or when the traffic information describes the increased traffic volume.

11. The method of claim 1, wherein the lane being currently traveled is determined on a basis of a data set stored in a storage device, in particular a database of a navigation device of the motor vehicle.

12. The method of claim 1, wherein the determined edge of the lane is a left, inside edge of the lane.

13. A motor vehicle comprising:
a sensor; and
a controller configured to:
    carry out an autonomous and/or partially autonomous driving operation in which the motor vehicle is moved along a predetermined driving trajectory;
    determine an edge of a lane being currently traveled by the motor vehicle, wherein the determining is based on predefined regulations for forming an emergency lane;
    shift a driving trajectory running centrally along the lane currently traveled to the determined edge of the lane without leaving the lane to form the emergency lane based on:
        lane information describing a current location of the motor vehicle,
        emergency vehicle information received via a communication module or the sensor,
        speed information describing a current speed of the motor vehicle, and
        traffic information describing a current traffic volume in surroundings of the motor vehicle, wherein the driving trajectory is shifted based on the current speed of the motor vehicle being below a limit value and the current traffic volume in the surroundings of the motor vehicle indicating an increased traffic volume,
    adjust, when the motor vehicle is on a multi-lane road, the driving trajectory from the determined edge of the lane to another edge of the lane, the other edge of the lane being determined based on the predefined regulations and the current location of the motor vehicle on the multi-lane road; and
    maintain the shifted driving trajectory until the emergency lane is no longer required.

14. The motor vehicle of claim 13, wherein the determined edge of the lane is a left, inside edge of the lane.

* * * * *